United States Patent [19]

Vyas

[11] Patent Number: 5,273,554
[45] Date of Patent: Dec. 28, 1993

[54] PROCESS FOR FABRICATING A BATTERY

[75] Inventor: Brijesh Vyas, Warren, N.J.

[73] Assignee: AT&T Bell Laboratories, Murray Hill, N.J.

[21] Appl. No.: 39,709

[22] Filed: Mar. 31, 1993

Related U.S. Application Data

[63] Continuation of Ser. No. 784,485, Oct. 29, 1991, abandoned.

[51] Int. Cl.⁵ .............................................. H01M 4/16
[52] U.S. Cl. .................................... 29/623.5; 205/63
[58] Field of Search ........................ 29/623.5, 623.1; 205/63, 57; 427/380; 429/225, 227; 423/434, 619

[56] References Cited

U.S. PATENT DOCUMENTS

| | | | |
|---|---|---|---|
| 1,498,359 | 6/1924 | Dodge | 429/227 |
| 1,944,065 | 1/1934 | Chamberlain | 429/227 |
| 2,938,063 | 5/1960 | Greenburg et al. | 429/227 X |
| 3,765,943 | 10/1973 | Biagetti | |
| 3,788,898 | 1/1974 | Yarnell | |
| 3,899,349 | 8/1975 | Yarnell | |
| 4,338,163 | 7/1982 | Rittenhouse | 429/227 X |
| 4,381,250 | 4/1983 | Rittenhouse | 429/227 X |
| 4,415,410 | 11/1983 | Reich | 204/2.1 |

OTHER PUBLICATIONS

Vinal, G. W., *Storage Batteries*, John Wiley & Sons, 1955.
Martin, L. F., *Storage Batteries and Rechargeable Cell Technology*, Noyes Data Corporation, 1974.
Barak, M. (ed.), *Electrochemical Power Sources*, Peter Perogrinus Ltd., 1980.
Bode, H. et al, *Electrochimica Acta*, 1, pp. 318-325, 1959.
Bode, H., *Lead-Acid Batteries*, John Wiley & Sons, 1977.

*Primary Examiner*—Anthony Skapars
*Attorney, Agent, or Firm*—Bruce S. Schneider

[57] ABSTRACT

Batteries based on lead chemistry, e.g., lead-acid batteries, are substantially improved through the use of a particular positive material. This material is formed by the electrochemical conversion of tetrabasic lead sulfate (TTB) where this TTB is synthesized at a pH in the range 9.3 to 12 and under reaction conditions that provide a substantial excess of sulfate to the reactive lead. The resulting materials provide needle-like structures with a width generally in the range 3 to 1 $\mu$m. The relative narrow needles, when employed on the positive electrode of a lead acid battery, improve the efficiency of formation, provide good adhesive to the positive plate, extend battery life, as well as, yield excellent capacity per gram of active material.

9 Claims, 4 Drawing Sheets

PROCESS FOR FABRICATING A BATTERY

This application is a continuation of application Ser. No. 07/784485, filed on Oct. 29, 1991 now abandoned.

BACKGROUND OF THE INVENTION

1. Technical Field

This invention relates to batteries, and in particular, batteries based on lead chemistry.

2. Art Background

Batteries, such as lead acid batteries, are ubiquitous in today's society. Lead batteries are employed for many uses such as in the electrical systems of automobiles. Additionally, these batteries are employed in applications such as emergency power for telecommunication systems where occasional, but extremely reliable, use is necessitated. Such diversified use imposes an equal diversity of required properties.

The structure of the positive plate of a lead based battery is a primary factor affecting its life and its current generating efficiency. Lead dioxide is employed as the active positive material. Typically, a paste of a precursor to the lead dioxide is applied to a lead grid to make the positive plate. The precursor is then electrochemically oxidized to the lead dioxide.

In particular, for conventional positive plate fabrication, powders of Pb, PbO, $Pb_3O_4$ or their mixtures are mixed with water and $H_2SO_4$ to form a paste with good adhesivity to the lead grid. This paste, depending on the ratio of starting materials, rate of mixing and the temperature, contains mixtures of the initial powders, lead sulfate, and basic lead sulfates such as $PbOPbSO_4$, $3PbOPbSO_4.H_2O$, and $4PbOPbSO_4$ (TTB). The paste is applied to a lead or lead alloy grid and the plates are cured. Curing consists of exposing the plates to a controlled environment of temperature and humidity, where further reaction of the ingredients occur, resulting in a different ratio of the lead oxides, sulfate, and the basic lead sulfates. The cured plates are then immersed in sulfuric acid where, in a step denominated formation, the paste material is electrochemically oxidized to $PbO_2$, the active material of the positive plate of the lead acid battery.

TTB, which crystallizes as large elongated prismatic crystals, undergoes anodic conversion to $PbO_2$ without losing the prismatic structure. The interlocking of these prismatic crystals provides mechanical strength to the positive plate and are thus less susceptible to shedding during battery cycling. For this reason, batteries for deep cycling are generally manufactured with a large amount of TTB in the active material at the end of the curing process. The large crystals of TTB typically employed provide strength to the positive electrode during use, but their formation is inefficient and their utilization (capacity per gram of active material) is lower than other oxides. Indeed, electrodes made with a large amount of TTB have up to 25% less capacity than conventional electrodes and often require up to 30 deep charge-discharge cycles to reach their rated capacity.

Biagetti (U.S. Pat. No. 3,765,943, dated Oct. 16, 1973) discloses a process to produce TTB crystals by reacting, at a temperature above 70° C., stoichiometric ratios of orthorhombic PbO and sulfuric acid in an aqueous solution using a slowly stirred reaction vessel. Plates are made by mixing the resulting TTB with water and applying the resulting paste to a lead grid. These plates containing essentially 100% TTB have long life. However, as discussed, the oxidation of the TTB to $PbO_2$ is relatively inefficient due to the large size of the crystals employed.

Thus, although prismatic crystals of TTB improve the adhesion of active material during use, their performance has not been entirely satisfactory. The capacity per gram of active material is generally lower than plates formed by conventional techniques. Additionally, conversion from the precursor into the active material is relatively slow. Improvement in conventional lead acid batteries, and in particular, the lifetime of such batteries, is quite desirable. Approaches for use of new precursor crystals have indeed generated hope that lifetime can be improved. Nevertheless, these approaches, although offering enhanced lifetimes, often yield batteries that are somewhat inefficient to produce and that have seduced capacity per gram of active material.

SUMMARY OF THE INVENTION

The use of a specific precursor positive electrode material yields adhesion characteristic of TTB and yet provides improved capacity and formation efficiency relative to conventional materials. This invention involves the reaction of lead oxide with an excess of sulfate. In one embodiment, a precursor is prepared by reacting lead oxide with sulfuric acid in the presence of an excess of sulfate to form a paste and applying the paste to a grid with subsequent curing. Control of the temperature below 60° C. in the reaction medium and of the sulfate excess yields, after curing at a temperature above 70° C. and 100% humidity, a positive plate having an extremely uniform prismatic size, TTB and a uniform pore distribution. Most significantly, the width of these crystals is extremely narrow—having average dimension in the range 1 to 2 microns—allowing rapid conversion to lead oxide from the precursor and further providing enhanced adhesion and current capacity attributes. Thus, the lead oxide obtained after conversion has prismatic crystals with an average crystal width less than 2.5 $\mu m$.

In a second embodiment, TTB of relative small prismatic size is achieved by just reacting lead oxide with sulfuric acid in a stirred aqueous solution containing excess sulfate at temperatures above 60° C. to immediately form TTB. The TTB is mixed with water to form a paste. Positive plates made by applying this paste to a lead grid and converted to lead oxide, also have higher current capacity attributes.

DETAILED DESCRIPTION

Figure 1:
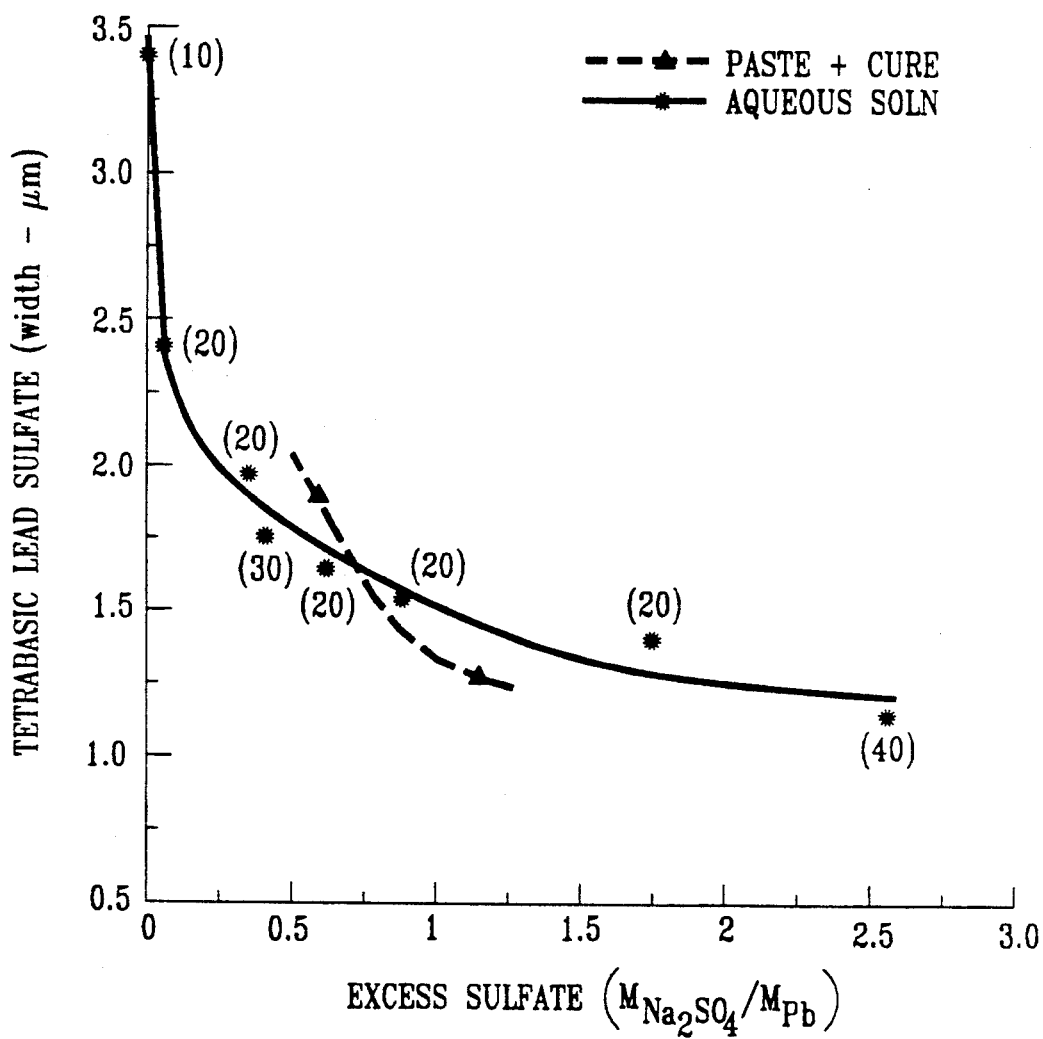
FIG. 1 is a graph plotting the average width of the TTB crystals versus the excess sulfate per reactive lead in the reaction.

As discussed, the invention involves a battery based on lead chemistry having a lead dioxide positive plate. The battery includes a positive plate, a negative plate, and electrolyte medium. The composition of the cathode and electrolyte are not critical and are typical those used in conventional batteries. A wide variety of suitable electrolytes and negative electrodes are described in compendiums such as "Storage Batteries", G. W. Vinal, John Wiley & Sons, 1955, "Storage Batteries and Rechargeable Cell Technology", L. F. Martin, Noyess Data Corp., 1974, and "Electrochemical Power Sources", ed. M. Barak, Peter Perogrinus Ltd., 1980. Briefly, typical electrolytes include sulfuric acid of a molarity in the range of 3 to 6, and typical negative materials generally include a combination of elemental lead and an expander. A variety of geometries are available for the battery structure and conventional geometries such as described in Vinal, Martin, and Barak supra are employable.

The material used as the electrochemically active component of the positive electrode should have a specific composition, i.e., should have a prismatic crystal structure with an average dimension measured normal to the long axis of less than 3 microns. Compositions satisfying this criterion are preferably produced by a specific reaction sequence to form a precursor material with subsequent electrochemical conversion of this precursor to the desired lead dioxide composition. Conversion of the precursor to the lead dioxide is accomplished by conventional techniques such as described in Vinal, Martin, and Barak supra. Typically, such conversion techniques involve electrochemical oxidation of the precursor applied to a supporting structure such as a lead grid.

The precursor for the above described conversion is formed by reacting lead oxide with sulfuric acid, for example, as described by Biagetti supra (which is hereby incorporated by reference) but in the presence of an excess of sulfate. Typically, for conversion, this reaction is performed in an aqueous medium. This aqueous medium includes the sulfate present as a sulfate salt such as sodium sulfate. The pH and temperature of the reaction medium and the quantity of sulfate present relative to lead deter-mines whether TTB is obtained. Bode, H. and Voss, E., Electrochemica Acta, Vol 1, p 318–325, 1959, and "Lead-Acid Batteries", H. Bode, John Wiley & Sons, 1977. Generally the pH of the reaction medium should be in the range 9.35 to 12. For a pH below 9.35, TTB is not formed, while for a pH above 12, lead monoxide is stable. To form TTB directly without curing, the temperature of the reacting medium should be greater than 60° C., preferably 80° to 90° C. Below 80° C. the reaction begins to slow and above 100° C. the water boils leading to loss of experimental control. Temperatures below 60° C. result in only tribasic lead sulfate and the two polymorphs, tetragonal and orthorhombic, of lead monoxide. Conversion of this combination to TTB is effected by subsequent heating (such as curing) to above 70° C.

Provided the pH and temperature are maintained in the desired range, 1 mole of sulfate reacts with 5 moles of lead oxide to form TTB. The effect of sulfate in excess of the stoichiometric amount is shown in FIG. 1. As can be seen, the average dimension achieved is strongly dependent on the degree of sulfate excess. Generally, to obtain the desired crystal dimensions, a sulfate excess relative to reactive lead (i.e. the ratio of excess sulfate in moles above stoichiometry to the amount of lead present in moles) should be greater than 0.1, preferably in the range 0.2 to 2. This excess generally is obtained by adding sodium sulfate.

Generally, for reactions done at temperatures above 60° C., the reaction of sulfuric acid with lead oxide is continued over a time period of 2 to 4 hours. Reaction times of less than 2 hours often tend to yield incomplete reaction, while reaction times longer than 6 hours, although not precluded, are inefficient and thus uneconomic. Reaction performed at temperatures below 60° C. should be done in a medium having a pastey consistency, i.e. a liquid to solids ratio of about 2 or less. In this embodiment, the precursor is prepared by reacting lead oxide with sulfuric acid in the presence of an excess of sulfate to form a paste and applying the paste to a grid with subsequent curing. The paste is pasted onto lead grids and cured, by exposure to a control environment of temperature greater than 70° C. and high relative humidity (typically 100%) from 6 to 16 hours. The curing gives in-situ precipitation of small TTB crystals, the size dependent on the sulfate excess relative to reactive lead, FIG. 1. In addition, in this embodiment, a uniform pore distribution is obtained which also aids in the superior performance of the positive plate. This reaction sequence based on an initial formation of tribasic lead at below 60° C. has the advantage of yielding unusually narrow TTB crystal size distribution.

The reactive lead should be introduced as orthorhombic lead oxide (i.e., at least 80% mole percent should be in the orthorhombic form). Use of other forms of lead oxide is not precluded.

The following examples are illustrative of batteries within the invention and methods of their fabrication.

EXAMPLE 1

Tetrabasic lead sulfate (T-FB) was synthesized by reacting orthorhombic lead oxide (PbO) with a stoichiometric amount of sulfuric acid. A solution (100 cc) containing varying amounts of $Na_2SO_4$ between 0.001 to 0.05M and acidified to pH=2 by adding $H_2SO_4$, was heated to 85° C., and then the PbO (5 gms. of Pb) was added to it. The mixture was stir-red for approximately 4 hours at this temperature and continuously titrated with the remaining $H_2SO_4$ to maintain a constant pH of 10. Conversion to T-FB was indicated by a change in the color of the solution from bright yellow to a sandy color. The solution was allowed to cool below 35° C., with stirring, the product was filtered, dried in a vacuum oven at 35° C. and the solid phase was confirmed by x-ray diffraction. Larger quantities of TTB were synthesized in a similar fashion by reacting either 25 gms. or 200 gms. of lead oxide in 200 or 1000 cc of 0.5M $Na_2SO_4$ solutions inspectively (Table 1).

TABLE I

| Reaction No. | PbO (gms.) | $Na_2SO_4$ (ml.) | (M) | Ratio ($M_{Na_2SO_4}/M_{Pb}$) | TTB width ($\mu$m.) |
| --- | --- | --- | --- | --- | --- |
| 1 | 5.39 | 100 | 0 | 0.0 | 3.46 |
| 2 | 5.39 | 100 | 0.001 | 0.035 | 2.38 |
| 3 | 5.39 | 100 | 0.01 | 0.35 | 1.96 |
| 4 | 5.39 | 100 | 0.05 | 1.73 | 1.43 |
| 5 | 25 | 200 | 0.5 | 0.92 | 1.52 |
| 6 | 200 | 1000 | 0.5 | 0.58 | 1.65 |

Monobasic lead sulfate (PbO.PbSO4) and tribasic lead sulfate (3PbO.PBSO4.H2O) were prepared by reacting stoichiometric amounts of PbO and H2SO4. PbO was added to water acidified to pH=2 with H2SO4 and at 55° C. and then adding the remaining acid drop wise with stirring. The products were dried and the phases confirmed by x-ray diffraction. TTB was also synthesized by reacting the mono- and tri-basic lead sulfate (5 gms. Pb) with 0.5M and 0. 1 M NAOH solution, respectively, at 85° C.. The solution was titrated to a constant pH of 10. Cooling and separation were as described above. In all cases, the resultant TTB crystals were examined by scanning electron microscopy and their size measured at 2460X magnification.

FIG. 1 is a plot of the size (mean width) of the TTB particle synthesized in the presence of varying amounts of sulfate present in the solution during the reaction. The size of the TTB decreased as the excess sulfate concentration increased. The point marked (10) is the TTB produced with no Na2SO4 added. The points marked (20) were in the presence of excess sulfate added as Na2SO4. The points marked (30) and (40) are for reaction of 3PbO.PbSO4.H2O and PbO.PbSO4 With NAOH as shown in the following equations:

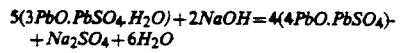

$$5(3PbO.PbSO_4.H_2O) + 2NaOH = 4(4PbO.PbSO_4) + Na_2SO_4 + 6H_2O$$

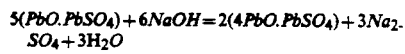

$$5(PbO.PbSO_4) + 6NaOH = 2(4PbO.PbSO_4) + 3Na_2SO_4 + 3H_2O$$

The length of the particles varied from 10 to 30 microns on all the reactions. However, on observation, it was found that many of the particles were broken, probably due to excessive stirring and handling, and therefore, they could not be accurately measured. These was a distinct variation in the width of the particles that could be accurately measured. (The width has the largest effect on the resultant surface area per gram of the active material precipitated and directly effects the electrochemistry of the charge-discharge reaction.)

EXAMPLE 2

Pastes were made by adding water to the TTB powders made in Example 1, reaction nos. 1, 3 and 4, and these pastes were attached to a lead grid (3×3×0.076cm.). The resultant electrode was dried in moist air at 400° C. for 24 hours followed by further drying at room temperature for an additional 24 hours. The porosity of the electrodes was measured by the water pick-up technique. All the electrodes contained approximately 2 grains of TTB and had a porosity of 68 to 71%. The electrodes were placed between two conventional negative electrodes of the lead-acid system and separated by a 0.5 cm. glass fiber separator. The electrode stack was electrochemically oxidized to PbO2 in 1.020 sp. gr. H2SO4 (0.42M) at room temperature for 48 hours at 20 mA. The total charge applied represented 200% of that required based on a two electron conversion. All the samples were convened to PbO2 as confirmed by x-ray diffraction. The electrode stack was then transferred to 1.300 sp. gr. H2SO4 (5.3M) and potentiodynamically cycled between 850 and 1400 mV at a scan rate of 0. 1 mV/s. All potentials were measured with a Hg/HgSO4 (1.300 sp. gr. H2SO4) reference electrode placed close to the working electrode, with no IR correction.

Figure 2:
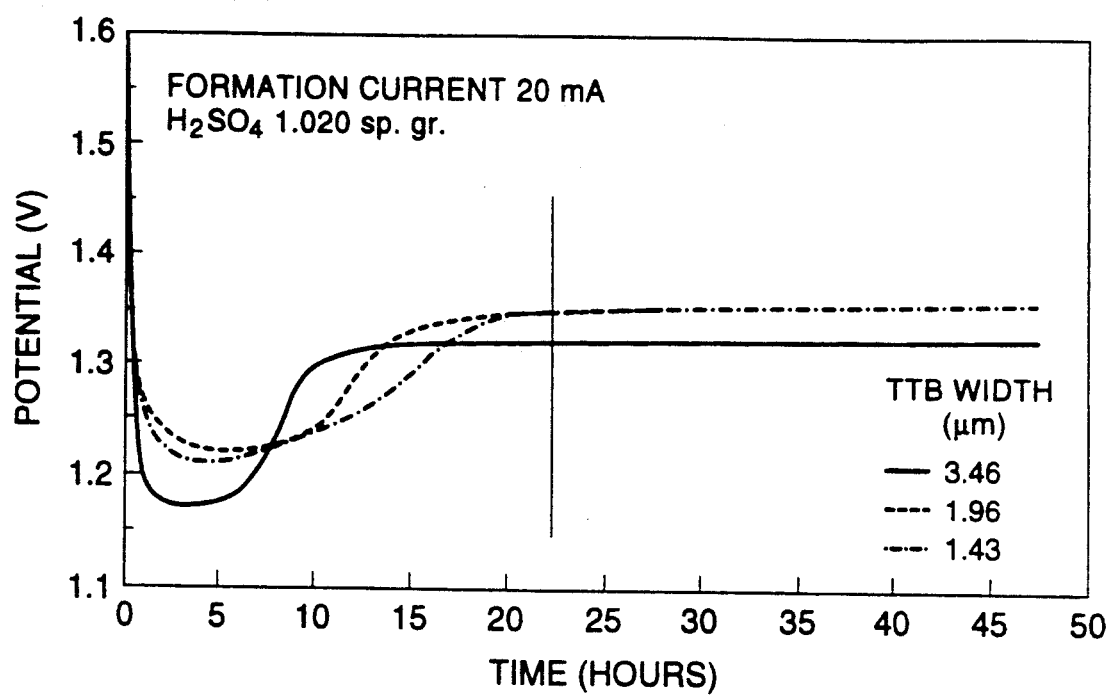
FIG. 2 is positive electrodes potential versus a $Hg/HgSO_4$ (1.3 sp. gr. $H_2SO_4$) reference electrode versus time of formation for reactions 1, 3, and 4 in Example 1.

The potential of the electrodes made with the TTB of different sizes versus time of formation is shown in FIG. 2. All the plates started at a high potential (1.8V) due to the low conductivity of the TTB. As the formation proceeded and the active material was converted to PbO2, which has close to metallic conductivity, the potential dropped to a minimum. At this potential, the main reaction was conversion of the TTB to PbO2. As more of the surface of the active material was converted, the potential began to rise again and reached a new plateau value. The main electrochemical reaction at this potential was the reaction of water to produce oxygen. However, a small part of the current continued to oxidize the active material tO PbO2. Table Ill represents formation time (time before it reaches a plateau of potential) which is an arbitrary indication of the formation efficiency. These times can be compared to the times required for formation with 100% efficiency. In these experiments, 200% of the theoretical charge required for formation was passed, and all the electrodes were completely converted to PbO2.

TABLE II

| Reaction No. | Active Material (gms.) | Formations (hours) | Capacity (mAh) | Utilization (mAh/gm) |
|---|---|---|---|---|
| 1 | 2.06 | 8.4 | 131 | 64 |
| 3 | 1.94 | 12.0 | 209 | 107 |
| 4 | 1.97 | 14.1 | 278 | 141 |

Figure 3:
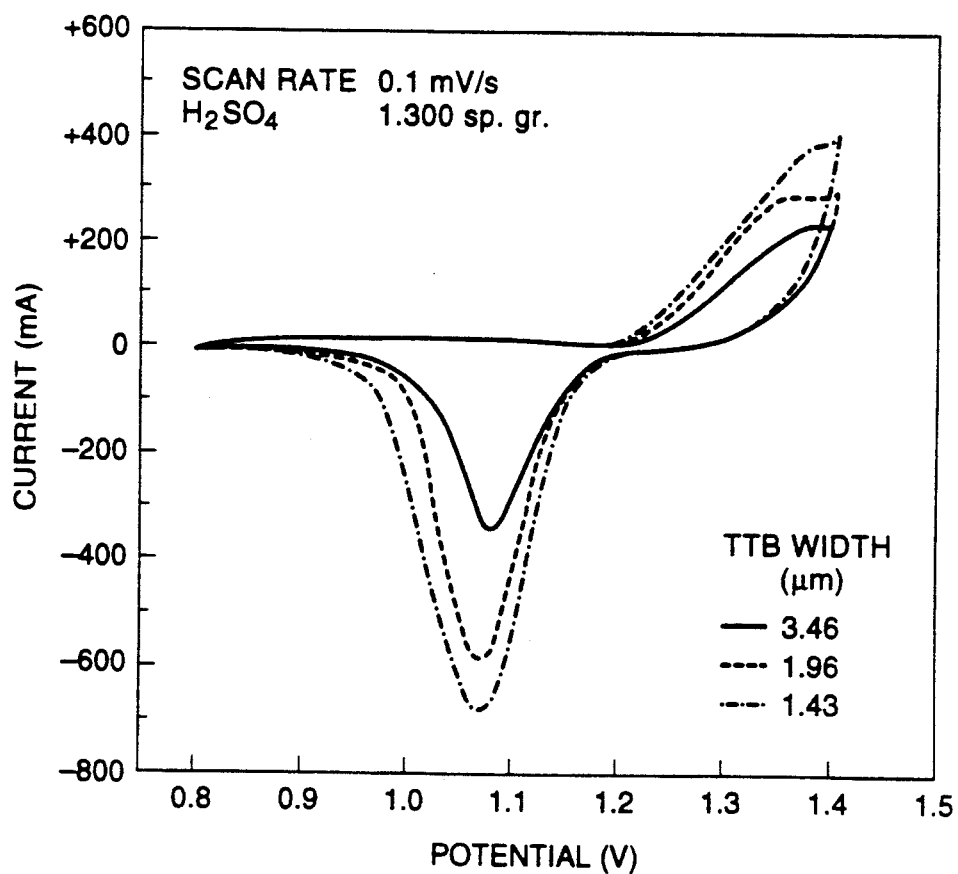
FIG. 3 is cyclic voltagrams (potential versus current) for positive electrodes indicating increasing capacity with decrease in TTB crystal size.

After formation, the electrode stack was cycled in 1.300 sp. gr. H2SO4, the acid of interest in the battery. The cyclic voltagrains for the 5the cycles for the electrodes of decreasing size of the TTB is shown in FIG. 3. The area under the curve in the negative current direction represents the discharge reaction and is an indication of the capacity of the three electrodes. It is clear that the capacity of the electrode increased as the initial particle size of the TTB decreased. On the first discharge, the capacity realized was low since the electrode and the separator stiff contained the lower concentration of the formation acid. The capacity increased to a stable value on the 3rd cycle and this value continued over the next five cycles.

EXAMPLE 3

A paste was prepared by reacting 5 moles of orthorhombic PbO with 1 mole of H2SO4 in presence of amounts of Na2SO4, ranging from 0.05 to 1.0M. Orthorhombic PbO (200 gm.) was added to 23 ml of Na2SO4 solution, acidified to a pH of 2 by the addition of H2SO4, and mixed thoroughly for half an hour. Then the remaining 1.3 sp. gr. H2SO4 was added to the mixture at a rate of about 1 ml/min and continued the mixing of the resultant paste. The reaction of the acid with the PbO is exothermic and raises the temperature of the paste. Therefore, the rate of the acid addition was controlled to keep the temperature of the paste below 50° C. After all the acid was added, the paste was mixed for another half an hour until it had a smooth consistency and was then allowed to cool to room temperature. The density of the paste was obtained by measuring its weight in a precision cup of a fixed volume of two cubic inches and was 3.85 gms/ml. X-ray diffraction was used to determine the phases present in the paste. The paste was applied to 0.2 in. thick lead grids and the resultant plates were allowed to dry in the ambient atmosphere for 3 hours. The dried plates were cured at 85° C. and 100% humidity for 16 hours. After removing from the oven, they were allowed to cool to room temperature, washed for 3 hours in flowing deionized water, and dried at 500° C. overnight. Pellets (1.25 cm by 1.78 cm) were removed from the dry plate for further investigations. The phases present were determined by x-rays and the crystal size by scanning electron microscopy. In addition, the porosity and the pore size distribution of the pellet was determined by Hg porosimetry. The results are shown in Table III.

cally oxidized to $PbO_2$ (formation) at 2.5A in 1.020 sp. gr. $H_2SO_4$ (0.42M) at room temperature for 72 hours. The total charge applied represents greater than 150% of required based on a two electron conversion. All the samples were converted to $PbO_2$ as confirmed by x-ray diffraction. Hg porosimetry was used to determine the pore distribution of the experimental and control plates,

TABLE III

| Reaction | PbO (gms) | $Na_2SO_4$ (M) | ratio ($M_{Na2SO4}/M_{Pb}$) | Phases in Paste* | Phases after Cure | Plate | | | |
|---|---|---|---|---|---|---|---|---|---|
| | | | | | | TTB width (μm) | Porosity (%) | Median Pore (μm) | Area (m²/gm) |
| 9 | 200 | 0 | 0.0 | TRL, t-PbO, O-PbO | TTB, TRL t-PbO, O-PbO | | | | |
| 10 | 200 | 0.05 | 0.056 | TRL, t-PbO, O-PbO | TTB | 15–20 | 52 | 13.6 | 2.5 |
| 11 | 200 | 0.5 | 0.56 | TRL, t-PbO, O-PbO | TTB | 1.92 | 53 | 5.7 | 2.7 |
| 12 | 200 | 1.0 | 1.16 | TRL, t-PbO, O-PbO | TTB | 1.26 | 54 | 4.4 | 2.8 |

TRL = $3PbO \cdot PbSO_4 \cdot H_2O$
t-PbO = tetragonal lead monoxide
O-PbO = orthogonal lead monoxide In all the experiments, the phases present in the paste before curing were tribasic lead sulfate ($3PbO \cdot PBSO_4 \cdot H_2O$) and the two polymorphs, tetragonal and orthogonal, lead monoxide. These are the only phases that are stable in the reaction if the temperature of the paste is kept below 600° C. If the temperature of the paste rises above 600° C., TTB is formed in the paste and this results in a random distribution of TTB crystal sizes after curing. Thus, as discussed, maintaining the temperature of the paste below 600° C., preferably in the region of 500° C., is important if the tightest size distribution is desired. The paste made with no addition of $Na_2SO_4$ (reaction 9) did not result in complete conversion to TTB upon subsequent curing at 85° C. and 100% humidity for 16 hours. Pastes of this formulation were also cured for 72 hours without complete conversion. In contrast, reactions 10, 11, and 12 with varying amounts of $Na_2SO_4$ also had tribasic lead sulfate, tetragonal, and orthorhombic lead monoxide in the paste, however, on subsequent curing, they were completely converted to TTB as detected by x-rays. For the paste with 0.05M $Na_2SO_4$ the TTB crystals were relatively large—100 microns long and width of 15–20 microns. In the case of the pastes prepared with 0.5M and 1.0M $Na_2SO_4$, the TTB crystals were significantly smaller—20–30 microns long and 1–2 microns wide, FIG. 1. The sizes are similar to that found in the reactions conducted in a stirred aqueous solution (reactions 2–6). In addition to controlling the crystal size, the porosity distribution is affected by the addition of $Na_2SO_4$ to the paste. Although the total porosity of the plates for reactions 10 to 12 are similar, their median pore size is significantly changed. Also, most of the porosity is achieved with pores of dimension close to the median pore size. Thus, the process described provides means to control the crystal size of the TTB and controls the macroscopic structure of the positive plate by controlling the porosity, pore distribution, and surface area of the plate.

EXAMPLE 4

A large batch of paste was made by reacting 3 Kg of PbO with stoichiometric amount of $H_2SO_4$ in the presence of 0.5M $Na_2SO_4$ by mixing the ingredients in a fixed speed laboratory paste mixer using the procedure described in Example 3. The large batch was used to make 6.5 in. × 7.0 in. × 0.2 in. positive plates for cycling tests and compared versus control plates. Control plates were made by making a paste of 75% TTB (reaction 1, containing no $Na_2SO_4$), 25% $Pb_3O_4$ and water to a density of 4.2 gm/ml and pasting to lead grids. The control plates were then dried at 40° C. for 72 hours. The experimental and control plates were electrochemically oxidized to $PbO_2$ (formation) at 2.5A in 1.020 sp. gr. $H_2SO_4$ (0.42M) at room temperature for 72 hours.

Figure 4:
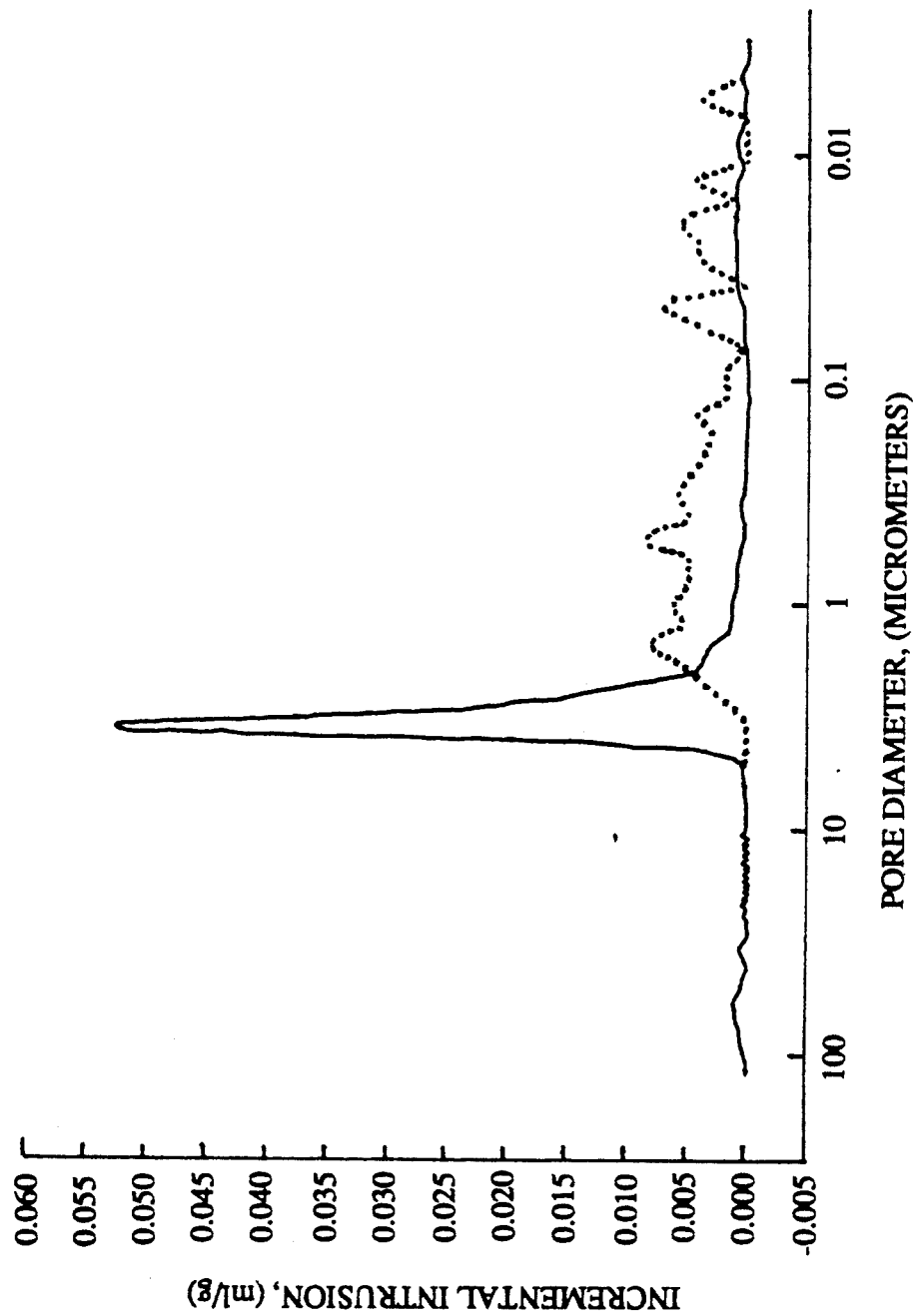
FIG. 4 is pore size distribution, pore volume versus pore diameter for experimental and control positive plates after formation prepared as described in Example 4.
Figure 5:
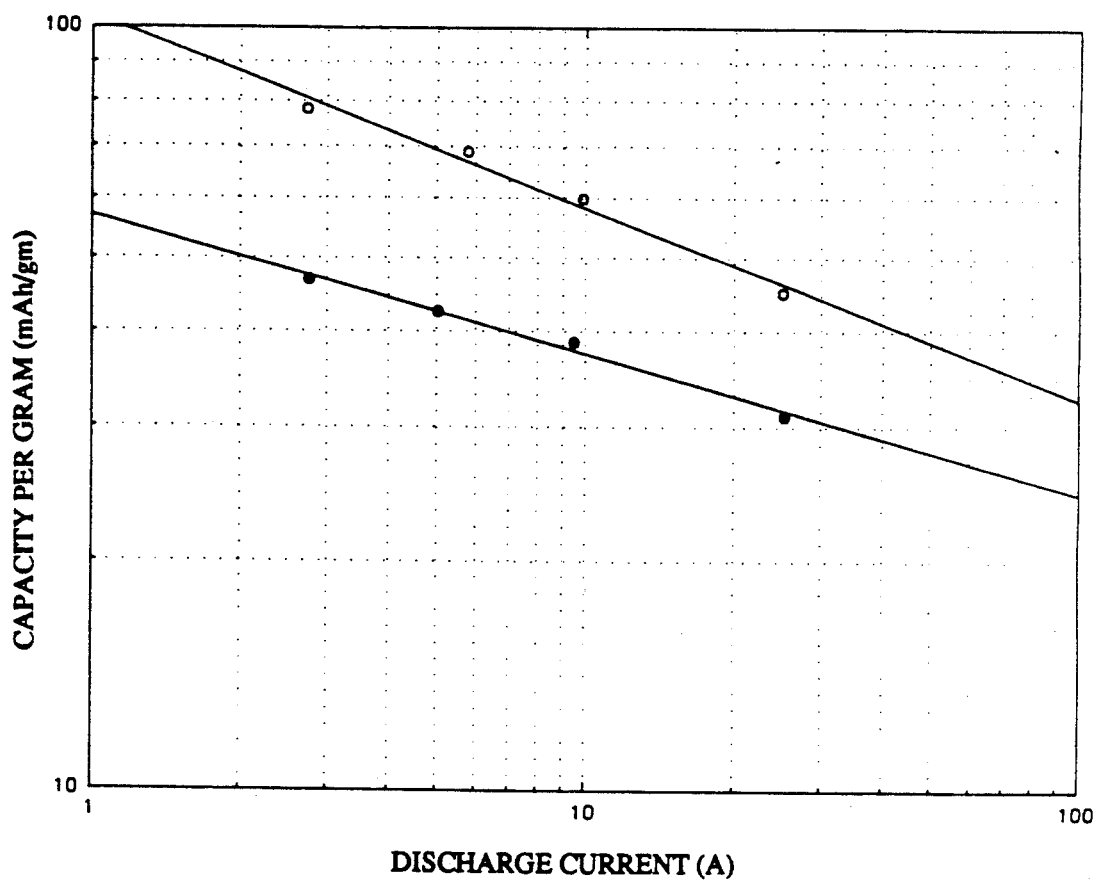
FIG. 5 is utilization, capacity per gram of active material versus discharge current indicating the higher utilization of the experimental plates over the control plates of Example 4.

FIG. 4. The total porosity of the two types of plates were similar (49% for the experimental plate and 46% for the control plates), however, the pore distribution was significantly different. Most of the pores in the experimental plates were in the 4 to 1.5 microns while in the control plates, pores of 2 to 0.005 microns were randomly distributed.

For cycling tests, the positive plate was placed between two negative lead plates and separated by a glass fiber matt and placed in 1.300 sp. gr $H_2SO_4$ (5.3M). Me plates were charged to a constant cell potential of 2.4V and discharged at a constant current to a cutoff voltage of 1.75V. After about 40 one-day cycles—discharge for 4 hours at the 5.8A and 5A for the experimental and control plates respectively, and charged to 2.4V for the remaining 20 hours with maximum current of 2.5A, the cells were discharged at different currents and two days of charge. The capacity per gram of the active material for the experimental and control plates is shown in FIG. 6. The experimental plates show greater than 40% higher capacity per gram over all the discharge rates (25A to 2.5A) tested.

I claim:

1. A process for fabricating a battery that has a lead based electrode comprising the steps of reacting at a pH in the range 9.35 12 lead oxide with sulfate in the presence of a stoichiometric excess of said sulfate to form a reaction product wherein said reaction is performed at a temperature of at least 60° C. or said reaction product is subjected to a temperature of at least 60° C., applying a material comprising at least one component of said reaction product to an electrode structure and converting said material to lead dioxide.

2. The process of claim 1 wherein said reaction is performed in a liquid medium.

3. The process of claim 2 wherein said reaction is performed at a temperature above 60° C.

4. The process of claim 3 wherein said material is formed into a paste.

5. The process of claim 1 wherein said reaction is performed at a temperature below 60° C.

6. The process of claim 5 wherein said material is formed into a paste.

7. The process of claim 6 including the step of curing said paste on said electrode.

8. The process of claim 1 wherein said excess is introduced as a sulfate salt.

9. The process of claim 1 wherein said lead dioxide has a prismatic crystal structure and an average crystal width less than 2.5 μm.

* * * * *